Figure 2B:
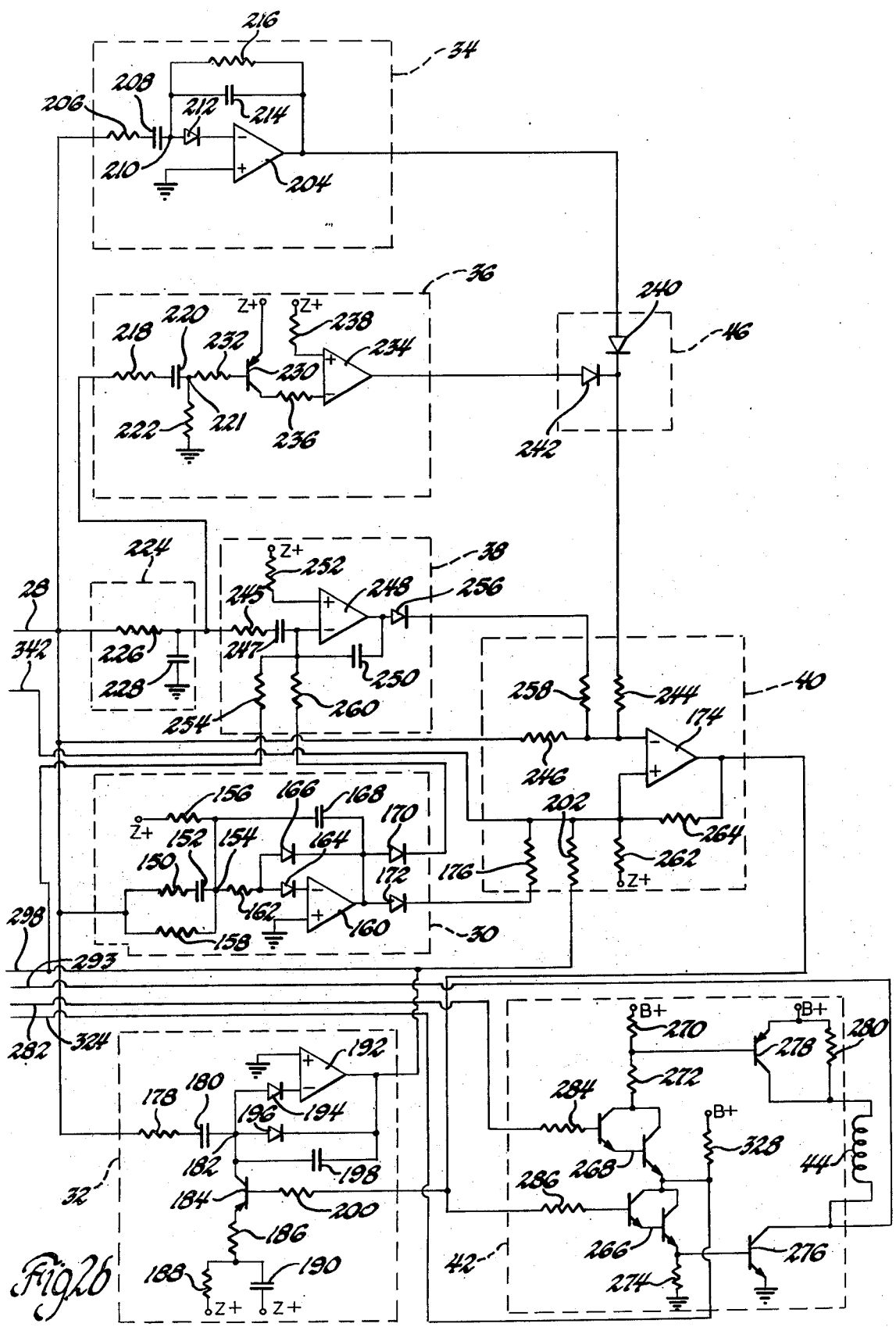

United States Patent [19]

Peterson et al.

[11] 4,061,403

[45] Dec. 6, 1977

[54] WHEEL LOCK CONTROL SYSTEM

[75] Inventors: Philip R. Peterson, Grand Blanc; David W. Taylor, Davison, both of Mich.

[73] Assignee: General Motors Corporation, Detroit, Mich.

[21] Appl. No.: 727,942

[22] Filed: Sept. 29, 1976

[51] Int. Cl.² .............................................. B60T 8/02
[52] U.S. Cl. ..................................... 303/106; 303/20; 303/107
[58] Field of Search ................. 188/181; 303/20, 105, 303/106, 107; 361/238, 239; 324/162; 340/53, 62

[56] References Cited

U.S. PATENT DOCUMENTS

| 3,556,610 | 1/1971 | Leiber ................................ 303/106 X |
| 3,640,588 | 2/1972 | Carp et al. ............................ 303/106 |

Primary Examiner—Stephen G. Kunin
Attorney, Agent, or Firm—Howard N. Conkey

[57] ABSTRACT

A wheel lock control system for cyclically releasing and applying the wheel brakes to prevent wheel lock during braking. A deceleration switch produces a control signal to effect a wheel brake release when the wheel speed exceeds a predetermined deceleration threshold representing an incipient wheel lock condition. A cycle depth integrator provides a cycle depth signal that is representative of the magnitude of the change of wheel speed after a brake release. A cycle depth comparator is responsive to the control signal and the cycle depth signal to effect wheel brake release during the control signal and to maintain the wheel brake release as a function of the cycle depth signal magnitude and duration and wheel speed characteristics to provide for adaptation to all vehicle and road conditions. A reset circuit cooperates with the cycle depth integrator to maintain a release to provide for wheel speed recovery when the average wheel deceleration exceeds a maximum possible vehicle deceleration after a time period dependent upon the magnitude of the average wheel deceleration and the time period that the average wheel deceleration exceeds the maximum possible vehicle deceleration.

4 Claims, 7 Drawing Figures

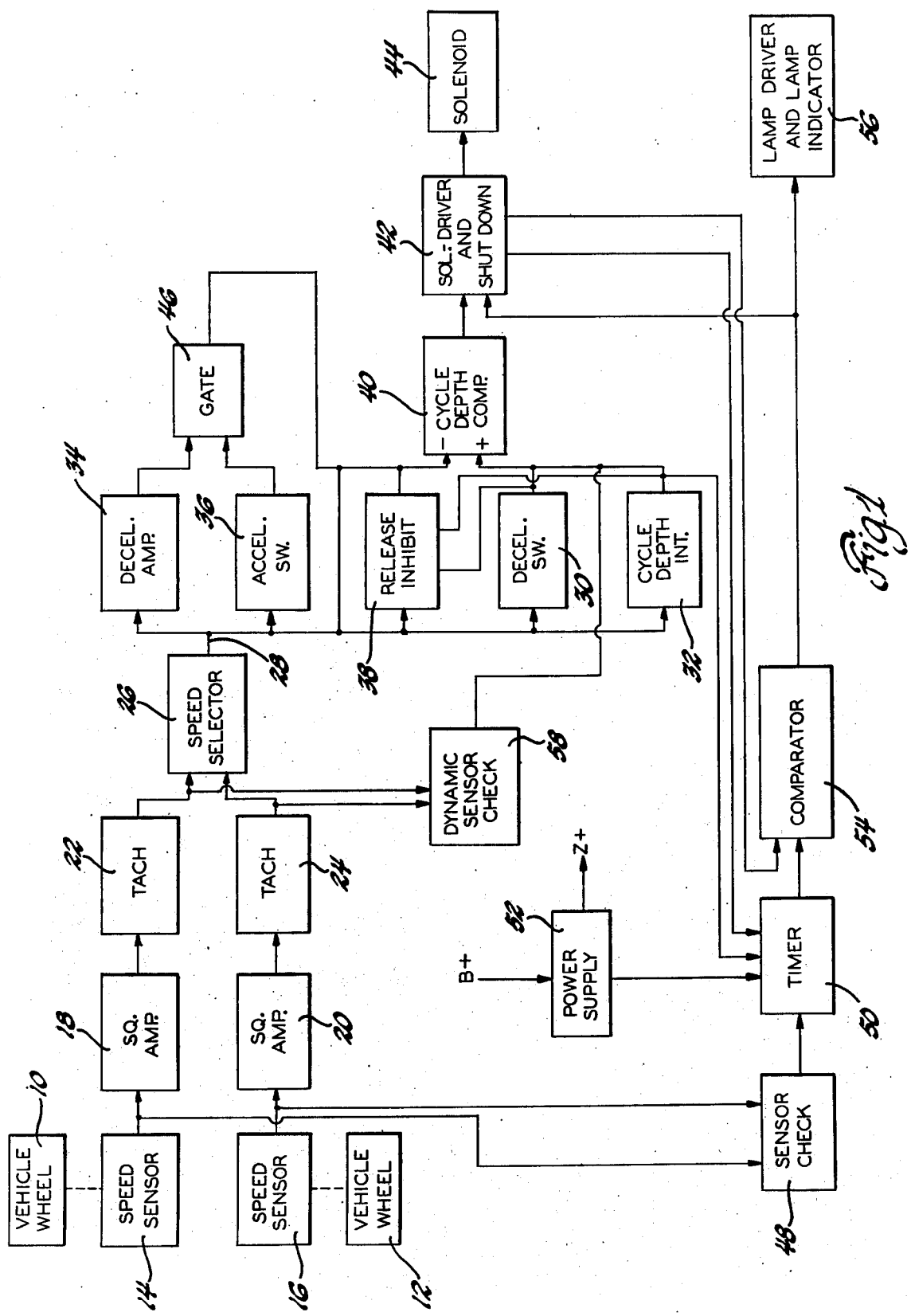

Fig. 2a

WHEEL LOCK CONTROL SYSTEM

This invention relates to a wheel lock control system for vehicle brakes which is adaptive to all vehicle load and road conditions.

U.S. Pat. No. 3,953,080, which is assigned to the assignee of this invention, sets forth a wheel lock control system particularly adapted to provide wheel lock control for heavy duty trucks with air brakes and which is adaptive to various vehicle and road conditions. The general object of this invention is to provide an improved wheel lock control system which is adaptive to all vehicle and road conditions.

It is another object of this invention to provide a wheel lock control system which initiates a brake release as a function of the vehicle wheel deceleration and provides for brake reapplication as a function of the magnitude and duration of the wheel speed departure from the wheel speed at the time of brake release.

It is another object of this invention to provide a wheel lock control system having three control modes, each of which is operable under certain vehicle and road conditions to provide optimum wheel lock control.

It is another object of this invention to provide a wheel lock control system which operates as a deceleration switch on certain vehicle and road conditions, as a wheel recovery system on other vehicle and road conditions, and as a wheel acceleration switching circuit on other vehicle and road conditions.

It is another object of this invention to provide a wheel lock control system for providing wheel spaced recovery when the average wheel deceleration exceeds a maximum possible vehicle deceleration.

The wheel lock control system of this invention is comprised of a circuit which has three modes of wheel lock control operation to provide optimum control of the wheel brakes during braking for all vehicle load and road surface conditions. A deceleration switch functions in all three modes to initiate a brake release when the wheel deceleration exceeds a reference deceleration level.

In the first mode of control, the duration of the brake release period is controlled by the deceleration switch which effects reapplication of the wheel brakes when the wheel speed deviation from the integral of the reference deceleration during release returns to zero. This mode of operation is generally associated with heavy vehicle load and/or high coefficient of friction road surface conditions.

In the second mode of control, the duration of the brake release is controlled by a comparison of the output of a cycle depth integrator with a cycle depth reference having a magnitude determined by wheel speed, wheel acceleration, and average wheel deceleration. The output of the cycle depth integrator is a cycle depth signal which is a composite signal comprised of a first portion representing the amount that the time integral of a deceleration reference signal exceeds the wheel speed during brake application, or stated another way, the amount that the wheel speed decreases below a reference speed decelerating at the reference deceleration, and a second portion which is the integral of wheel acceleration during brake release. The second deceleration reference is approximately equal to the reference deceleration level associated with the deceleration switch and generally represents a maximum possible vehicle deceleration level. During normal wheel lock control operation, the average wheel deceleration is equal to or less than the reference deceleration so that the cycle depth signal has a magnitude that generally represents the wheel speed change during a brake release period (hereinafter referred to as the cycle depth).

The duration of the brake release in the second mode of operation provides for wheel speed recovery and is a function of the magnitude and duration of the cycle depth and the magnitude of the cycle depth reference. This mode of operation is generally associated with medium vehicle load and/or medium coefficient of friction road surface conditions.

In the third mode of control, the duration of the brake release is controlled by a release inhibit circuit which is responsive to wheel acceleration to effect brake reapplication when the wheel acceleration decreases to a small value representing the wheel speed approaching vehicle speed. This mode of operation is generally associated with light vehicle loads and/or low coefficient of friction road surfaces.

A reset circuit is provided to reset the cycle depth signal at the output of the cycle depth integrator upon each brake reapplication to a value equal to the value the cycle depth signal would have obtained if the second deceleration reference were continually summed with the wheel acceleration signal throughout both the release and apply periods. When the average wheel deceleration is less than the reference deceleration, the cycle depth signal is reset to zero. However, when the average wheel deceleration exceeds the maximum possible vehicle deceleration, indicating that the wheel is approaching a wheel lock condition, the cycle depth signal has a magnitude that increases with each reset provided by the reset circuit until it attains a value during a brake release period that is greater than the cycle depth reference to maintain the wheel brake released and allow the wheel speed to increase toward vehicle speed to thereby prevent a wheel lock condition.

The invention may be best understood by reference to the following description of a preferred embodiment and the drawings in which:

FIG. 1 is a block diagram of the wheel lock control system incorporating the principles of this invention;

FIGS. 2a and 2b is a schematic electrical diagram of the wheel lock control system of FIG. 1; and FIGS. 3a, 3b, 3c and 3d are graphs representing the operation of the three operating modes of the wheel lock control system of FIGS. 1 and 2.

The following description of a preferred embodiment is directed toward the invention as applied to heavy duty trucks with air brakes. However, the invention is considered to be of general application for all wheeled vehicles and braking systems.

In the preferred embodiment of this invention it is contemplated that each axle of the vehicle is controlled independently of the other axles, both on the tractor and on the trailer, such that each axle will be furnished with a complete wheel lock control system, the brake systems on the several axles having in common only the manually controlled air pressure which is supplied at the will of the vehicle operator. However, it is understood that the invention contemplates the control of all the brakes on tandem axles with a single wheel lock control system or any other desired wheel-axle-control system combinations.

The system incorporating the principles of this invention follows the well established principle of sensing incipient wheel lock when brake pressure is applied to the vehicle brakes by the vehicle operator, releasing the brake pressure for a duration determined by the system, and reapplying the pressure. This cycle is repeated as necessary to achieve the desired braking action.

The term "acceleration" as used herein refers to both positive acceleration and deceleration unless otherwise specified. Further, the term "cycle depth" refers to the magnitude of wheel speed deviation during a wheel brake release period from the wheel speed at the time of wheel brake release.

Referring to FIG. 1, vehicle wheels 10 and 12 on opposed sides of a vehicle axle are connected with speed sensors 14 and 16, respectively, for sensing the wheel speeds. The speed sensors 14 and 16 are preferably toothed wheel variable reluctance electromagnetic transducers providing respective alternating signals having frequencies proportional to the wheel speeds. These signals are connected to squaring amplifiers 18 and 20, respectively, which provide square wave signals having a frequency equal to the frequency of the alternating signals from the speed sensors 14 and 16. The square wave signals from the squaring amplifiers 18 and 20 are coupled to respective tachometer circuits 22 and 24 which provide electrical analog signals having a magnitude proportional to the speed of the wheels 10 and 12, respectively. These analog signals are supplied to a speed selector 26 which transmits the analog signal representing the lowest wheel speed to a conductor 28.

The wheel speed signal on line 28 is supplied to a deceleration switch 30, a cycle depth integrator 32, a deceleration amplifier 34, an acceleration switch 36, a release inhibit switch 38 and the negative input of a cycle depth comparator 40.

The cycle depth comparator 40 generates a brake release signal when the magnitude of the signals to its positive input exceeds the magnitude of the signals to its negative input. The brake release signal is supplied to a solenoid driver and shutdown circuit 42 which energizes a release solenoid 44 in response thereto to effect a wheel brake release for the duration of the brake release signal.

The deceleration switch 30 generates a control signal when the wheel deceleration exceeds a reference deceleration representing an incipient wheel lock condition. The reference deceleration is approximately equal to the maximum possible vehicle deceleration and is made variable as a function of wheel speed. In this embodiment, it will be assumed that the reference deceleration representing incipient wheel lock is 0.9g at zero wheel speed and 1.3g at 60 mph wheel speed. The deceleration switch 30 terminates the control signal when the wheel speed deviation from the integral of the reference deceleration during release approaches zero. The control signal is coupled to the positive input of the cycle depth comparator 40.

The cycle depth integrator 32 provides a cycle depth signal to the positive input of the cycle depth comparator 40 which is a composite signal comprised of a first portion representing the amount that the time integral of a reference deceleration exceeds the wheel speed during brake application and a second portion which is the integral of wheel acceleration during brake release. The deceleration reference for the cycle depth integrator 32 is approximately equal to the deceleration reference in the deceleration switch 30 so that the cycle depth signal from the cycle depth integrator 32 generally represents the magnitude of wheel speed change (the cycle depth) during a brake release period. In this embodiment, it will be assumed that this deceleration reference is 1.0g. The brake release signal from the cycle depth comparator 40 is effective to terminate the deceleration reference in the cycle depth integrator 32 for its duration. When the release signal from the cycle depth comparator 40 is terminated to effect wheel brake reapplication, the cycle depth signal is set to the value equal to the amount that the time integral of the reference deceleration exceeds wheel speed during both brake application and release periods. When the average wheel deceleration is less than the reference deceleration, the cycle depth signal is set to zero. When the average wheel deceleration is greater than the reference deceleration, the cycle depth signal is set to a corresponding value as previously described.

The deceleration amplifier 34 provides a cycle depth reference signal whose magnitude is proportional to deceleration until it saturates at a predetermined deceleration level less than the deceleration reference in the deceleration switch 30. For example, in this embodiment, the deceleration amplifier 34 saturates when the wheel deceleration reaches approximately 0.8g. The scaling of the deceleration amplifier 34 is such that the control signal from the deceleration switch 30 will always revert to its low state before the deceleration amplifier 34 output shifts to a low state. This will insure that the cycle depth reference signal output of the deceleration amplifier 34 will extend beyond the termination of the control signal from the deceleration switch 30. The cycle depth reference output of the deceleration amplifier 34 is coupled to one input of a gate 46.

The acceleration switch 36 provides a cycle depth reference output signal upon the detection of a predetermined high level of positive wheel acceleration. For example, in this embodiment, the acceleration switch 36 provides the cycle depth reference signal when the wheel positive acceleration reaches approximately 2.0g's. The output of the acceleration switch 36 is coupled to a second input of the gate 46 whose output is coupled to the negative input of the cycle depth comparator 40.

The gate 46 functions to couple the output cycle depth reference signal from the deceleration amplifier 34 or the acceleration switch 36 having the greatest magnitude to the negative input of the cycle depth comparator 40. The sum of this signal and the wheel speed signal coupled to the negative input of the cycle depth comparator 40 represents a cycle depth reference to be compared with the cycle depth represented by the cycle depth signal from the cycle depth integrator 32. In this embodiment, the saturated output of the deceleration amplifier 34 represents a cycle depth of 3 mph and the output of the acceleration switch 36 upon the detection of the positive acceleration level represents a cycle depth of 3 mph. Further, the wheel speed input to the negative terminal of the cycle depth comparator 40 from line 28 provides a component of the cycle depth reference which is approximately equal to 1.5 mph for every 10 mph of wheel speed.

The release inhibit switch 38 is a "normally on" switch providing a release inhibit signal to the negative terminal of the cycle depth comparator 40. The release inhibit signal is terminated by a control signal generated by the deceleration switch 30 or upon the detection of a positive acceleration greater than a predetermined low acceleration level which is made variable as a function of the cycle depth signal magnitude. For example, in this embodiment, the release inhibit switch 38 terminates the release inhibit signal upon the detection of 0.5g positive acceleration at zero magnitude of the cycle depth signal and 0.1g for maximum cycle depth signal magnitudes. During the absence of a control signal and when the positive wheel acceleration decreases to below the predetermined low level, the release inhibit signal from the release inhibit switch is again generated.

The magnitude of the release inhibit signal from the release inhibit switch 38 is greater than the maximum magnitude of the cycle depth signal from the cycle depth integrator 32. Therefore, a brake release signal can be initiated at the output of the cycle depth comparator 40 only by the control signal generated by the deceleration switch 30 when the wheel deceleration exceeds the deceleration reference of the deceleration switch 30 representing an incipient wheel lock condition. Further, the magnitude of the control signal from the deceleration switch 30 is greater than the maximum cycle depth reference signal input to the cycle depth comparator 40 so that the control signal is always effective to provide a brake release signal and therefore a brake release for its duration.

After the release has been initiated by the control signal, the system response changes as a function of the length and depth of the wheel cycle as represented by the cycle depth signal from the cycle depth integrator 32, the deceleration of the vehicle, and the acceleration of the vehicle wheels.

For heavy vehicle loading and/or high coefficient surfaces, where the cycle depth is typically short and shallow, the controller will run only on the action of the deceleration switch 30. In this mode of operation, the termination of the control signal generated by the deceleration switch 30 is effective to provide for brake reapplication. This mode of operation provides optimum performance for high vehicle loading and/or high coefficient of friction road surfaces.

On medium coefficient of friction surfaces and/or for medium vehicle loading where the wheel speed cycle depth is larger, the cycle depth signal from the cycle depth integrator 32 in conjunction with the cycle depth references supplied to the negative input of the cycle depth comparator 40 control the duration of the brake release signal. In this mode of operation, the cycle depth signal has a magnitude greater than the cycle depth reference signals supplied to the negative input of the cycle depth comparator 40 upon termination of the control signal from the deceleration switch 30 and the brake release signal is extended until the cycle depth decreases to below the reference cycle depth. This mode of operation provides for optimum performance on medium coefficient of friction road surfaces and/or for medium vehicle load conditions.

For light vehicle loading and/or low coefficient of friction road surfaces, the release inhibit switch 38 provides a third mode of operation wherein the cycle depth signal from the cycle depth integrator 32 maintains a release until the inhibit switch 38 forces a brake reapplication when the positive wheel acceleration decreases to a low level representing that the wheel is approaching vehicle speed. At this low positive wheel acceleration level, the release inhibit switch 38 generates the release inhibit signal to effect termination of the brake release signal and initiate wheel brake reapplication. This mode of operation provides optimum performance for low vehicle loads and/or low coefficient of friction road surfaces.

The remainder of the circuit of FIG. 1 provides a self-check service to monitor malfunctions in the wheel lock control system and to provide for system shutdown and warning upon the occurrence of the malfunction.

The self-check circuit includes a sensor check circuit 48 which is responsive to the speed sensors 14 and 16 to provide a fault signal to a timer 50 when an open circuit in either of the sensors 14 and 16 is detected. Another fault signal is provided to the timer 50 from the system power supply 52 when the vehicle battery voltage B+ decreases to a level below the wheel lock control system regulated voltage Z+. The solenoid driver and shutdown circuit 42 also provides a signal to the timer 50 when an open or short circuit to ground occurs in the release solenoid 44 or during the period that the release solenoid 44 is energized to release the wheel brakes.

The timer provides an output at the trigger level of a comparator circuit 54 when one of the fault signals supplied thereto from the sensor check 48 or the power supply 52 has a duration that exceeds a predetermined time period or when the release solenoid is shorted to ground or open circuited or is energized to release the wheel brakes for a period extending beyond a predetermined time limit which is variable as a function of the cycle depth signal from the cycle depth integrator 32.

The comparator 54 is responsive to the output of the timer 50 attaining the trigger level to generate a shutdown signal which is supplied to the solenoid driver and shutdown circuit 42 to deenergize the release solenoid 44 and terminate a brake release or to prevent the energization of the release solenoid and thereby prevent initiation of a brake release.

To provide for fault conditions which may be self-correcting while yet preventing the wheel lock control logic from releasing the vehicle brakes at any time during a brake release signal once a fault is detected during the brake release signal, the comparator 54 is made latching or unlatching as a function of whether or not the wheel lock control system is commanding a release.

The comparator 54 receives a signal from the solenoid driver and shutdown circuit 42 representing the wheel lock control system output. If a fault occurs and thereafter self corrects while the wheel lock control system is in a brake apply mode, the shutdown signal from the comparator 54 exists only for the duration of the fault. However, if the fault coexists even momentarily with a brake release signal from the cycle depth comparator 40, the shutdown signal is generated by the comparator 54 for the duration of the longer one of the fault condition or the brake release signal. In this manner, the brake release signal is effective to latch the comparator 54 to provide the shutdown signal for its duration. Upon termination of the shutdown signal, the wheel lock control circuit is again operative to provide wheel lock control.

The fault signal from the comparator is supplied to a lamp warning circuit 56 to provide an indication of the fault condition.

To provide for a check of the sensors 14 and 16 that occurs for reasons other than loss of continuity, a dynamic sensor check 58 is provided which monitors the wheel speeds from the tachometers 22 and 24 and generates an output supplied to the cycle depth comparator 50 to initiate a brake release when one wheel speed exceeds the other by a predetermined amount, which, in this embodiment, is 17 mph. The output of the sensor check 58 will maintain the release beyond the maximum time limit and until the self-check circuit previously described provides a shutdown signal for disabling the wheel lock control circuit.

Referring to FIGS. 2a and 2b, a specific example of the system of FIG. 1 is set forth.

The regulated power supply 56 provides a regulated voltage Z+ for operating the wheel lock control system. The unregulated voltage B+ of the vehicle battery is coupled across a series circuit including a resistor 60, a Zener diode 62 and a resistor 64. The Zener diode provides a regulated voltage which is coupled to the base of an NPN transistor 66 whose collector is coupled to the battery supply B+. The transistor 66 is biased into conduction to supply the regulated voltage Z+ which is equal to the voltage at the cathode of the Zener diode 62 less the base-emitter drop of the transistor 66. The voltage Z+ is developed across a resistor 68.

The remainder portion of the regulated power supply 52 relates to the provision of a fault signal when battery voltage B+ becomes less than the desired regulated voltage Z+, which condition may affect operation of the wheel lock control circuit. This fault signal is provided by means of an NPN transistor 70 having its emitter grounded and having its collector electrode coupled to the emitter of the transistor 66 through a resistor 72. When the battery voltage B+ exceeds the breakdown voltage of the Zener diode 62, the resulting voltage drop across the resistor 64 is sufficient to bias the transistor 70 conductive so that the potential at its collector is at or near ground potential. However, if the battery voltage B+ should decrease to below the breakdown voltage of the Zener diode 62, the transistor 70 is biased nonconductive and the voltage at its collector is increased to approximately the battery voltage B+ to supply a signal through a diode 73 representing the fault condition. This fault signal is supplied to the self-check timer 50 through a conductor 74.

The squaring amplifier 18 includes a resistor 76 which is series coupled with the output coil of the speed sensor 14 between the regulated voltage Z+ and ground. The alternating output from the speed sensor 14 representing the speed of the vehicle wheel 10 on one side of the vehicle axle is coupled to the positive input of an operational amplifier 78 through series coupled resistors 80 and 82. The regulated voltage Z+ is coupled to the junction between the resistors 80 and 82 through a capacitor 84 and to the positive input of the amplifier 78 through a resistor 86. A bias is provided to the negative input of the amplifier 78 by means of a voltage divider comprised of resistors 88 and 90 series coupled between the regulated voltage Z+ and ground. A feedback resistor 92 is coupled between the output of the amplifier 78 and its positive input terminal.

The amplifier 78 and the remaining operational amplifiers in the circuit of FIGS. 2a and 2b are current amplifiers wherein the current input to the positive terminal is subtracted from the circuit input to the negative terminal and wherein a positive output is provided when the current input to the positive terminal exceeds the current input to the negative terminal. Further, the operational amplifiers have a normally high output when no current is supplied to the input terminals. The bias current supplied by the voltage divider comprised of the resistors 88 and 90 to the negative input of the amplifier 78 functions to bias the output of the amplifier 78 at ground potential. The squaring amplifier 18 is responsive to the alternating signal input from the speed sensor 14 to provide a square wave output having the same frequency.

The squaring amplifier 20 is comprised of the resistors 94, 96, 98, 100, 102, 104 and 106, a capacitor 108 and an operational amplifier 110 which is connected in identical manner as the squaring amplifier 18 to provide a square wave output having a frequency equal to the frequency of the alternating signal supplied by the speed sensor 16 and corresponding to the speed of the vehicle wheel 12.

The square wave output of the squaring amplifier 18 is supplied to a differentiating circuit in the tachometer 22 comprised of a resistor 112 and a capacitor 114. A positive current pulse is supplied to the positive input of an operational amplifier 116 through a diode 118 on each leading edge of each square wave signal from the squaring amplifier 18, and a negative current pulse is supplied to the negative input of the operational amplifier 116 through a diode 120 on the trailing edge of each square wave signal from the squaring amplifier 18. The negative input of the operational amplifier 116 is grounded through a capacitor 122. A feedback capacitor 124 is coupled between the output of the operational amplifier 116 and the negative input terminal thereof to provide for an integrator having an integrating scaling determined by a feedback resistor 126 parallel coupled with the capacitor 124. The output of the amplifier 116 is an analog voltage having a magnitude directly proportional to the speed of the vehicle wheel 10.

The tachometer 24 includes the resistors 128 and 130, the capacitors 132, 134 and 136, diodes 138 and 140 and the operational amplifier 142 coupled in identical manner as the tachometer circuit 22. The output of the tachometer 24 is an analog voltage having a magnitude directly proportional to the speed of the vehicle wheel 12.

The speed selector 26 is responsive to the wheel speed signals from the tachometer circuit 22 and the tachometer circuit 24 and provides a wheel speed signal output on conductor 28 which is equal to the speed of the slowest vehicle wheel 10 or 12. The speed selector 26 includes the PNP transistors 144 and 146 having their collectors coupled to ground and their emitters coupled to the regulated voltage Z+ through a resistor 148. The wheel speed signal from the tachometer 22 is coupled to the base of the transistor 144 and the wheel speed signal from the tachometer 24 is coupled to the base of the transistor 146. The output of the speed selector 26 on line 28 is the wheel speed signal having a magnitude equal to the output of the tachometer 22 or 24 associated with the slowest vehicle wheel plus the base-emitter voltage drop of the transistor 144 or 146 that is conducting.

The deceleration switch 30 includes a filter resistor 150 series coupled with a differentiating capacitor 152 between the conductor 28 carrying the wheel speed signal and a summing junction 154. The input to the summing junction 154 from the capacitor 152 is a current having a magnitude representing wheel acceleration. This acceleration signal is summed at the summing junction 154 with a current having a magnitude representing a reference deceleration that is representative of a maximum possible vehicle deceleration. This reference deceleration signal is comprised of two portions. The first portion is a constant current supplied to the summing junction 154 from the regulated voltage Z+ through a resistor 156 and the second portion is a current having a magnitude proportional to wheel speed which is supplied to the summing junction 154 through a resistor 158 coupled to the line 28 carrying the wheel speed signal. The reference deceleration signal supplied to the summing junction 154 represents a wheel deceleration of 0.9g at zero wheel speed increasing to 1.3g at 60 mph wheel speed.

The output of the summing junction 154 representing the sum of the wheel acceleration and the reference deceleration signal is supplied to the negative input of an operational amplifier 160 through a resistor 162 and a diode 164. A diode 166 is coupled between the anode of the diode 164 and the output of the operational amplifier 160 to remove a speed threshold introduced by the diode 164. The positive input terminal of the operational amplifier 160 is grounded. A feedback filtering capacitor 168 is coupled between the output of the operational amplifier 160 and the summing junction 154.

In the absence of wheel deceleration and for wheel decelerations less than the reference deceleration, the reference deceleration current supplied to the summing junction 154 through the resistors 156 and 158 and coupled to the negative input of the operational amplifier 160 is sufficient to bias the operational amplifier output at ground potential. During periods of wheel deceleration, current through the capacitor 152 removes current from the summing junction 154 with the amount of current through the capacitor being a function of the magnitude of wheel deceleration. When the wheel deceleration is such that the current through the capacitor 152 equals the reference deceleration current (wheel deceleration equaling the reference deceleration representing an incipient wheel lock condition), the output of the operational amplifier 160 shifts to a positive voltage level which comprises the control signal output of the deceleration switch 30. The resistor 162 functions to set a value of wheel speed change required before the input to the negative terminal of the operational amplifier 160 can be reduced to zero to initiate the control signal.

The control signal is coupled to the release inhibit circuit 38 through a diode 170 to terminate the release inhibit signal and is supplied to the cycle depth comparator 40 through a diode 172 to effect wheel brake release.

Due to the delays in the brake system, the brake pressure will continue to increase after the control signal is provided by the deceleration switch 30 causing a wheel deceleration greater than the reference deceleration threshold. The decreasing speed signal on the conductor 28 decreases the voltage at the summing junction 154 while the deceleration reference current supplied to the summing junction tends to restore the voltage at the summing junction 154 at approximately the deceleration threshold rate. The decreased voltage at the summing junction 154 represents the magnitude of departure of the wheel speed on line 28 from a reference speed decelerating at approximately the deceleration threshold rate. As the wheel deceleration stops and the wheel begins to accelerate, the junction 154 voltage rises in response to the wheel speed departure from the time integral of the reference deceleration approaching zero, at which point current is supplied to the negative input of the operational amplifier 160 to terminate the control signal.

The control signal is supplied to the positive input of an operational amplifier 174 in the cycle depth comparator 40 through a scaling resistor 176.

The cycle depth integrator 32 includes a filter resistor 178 series coupled with a differentiating capacitor 180 between the conductor 28 carrying the wheel speed signal and a summing junction 182. The input to the summing junction 182 from the capacitor 180 is a current having a magnitude representing wheel acceleration. This acceleration signal is selectively summed at the junction 182 with a current representing the reference deceleration of 1.0g which is approximately equal to the reference deceleration in the deceleration switch 30 and which represents the maximum possible vehicle deceleration. The reference deceleration current is selectively provided by a PNP transistor 184, and resistors 186 and 188 series coupled between the junction 182 and the regulated voltage Z+. A capacitor 190 is coupled in parallel with the resistor 188.

The reference deceleration current is supplied to the summing junction 182 by the transistor 184 when it is biased conductive.

The sum of the vehicle acceleration signal and the deceleration reference signal is supplied to the negative input of an operational amplifier 192 through a diode 194. The positive input terminal of the operational amplifier 192 is grounded. A diode 196 is coupled between the anode of the diode 194 and the output of the operational amplifier 192 to remove the speed threshold introduced by the diode 194. The operational amplifier 192 has a feedback capacitor 198 coupled between its output and the summing junction 182 to form an integrator.

The output of the operational amplifier 192 is normally held at ground potential by the deceleration reference current supplied to the junction 182. However, when the current away from the junction 182 through the capacitor 180 resulting from wheel deceleration exceeds the current into the junction 182 through the transistor 184, the output of the amplifier is the cycle depth signal which is the integral of the summation of the currents until the integral again attains zero or ground potential which defines a limit of integration.

The conduction of the transistor 184 is controlled by the brake release signal from the output of the cycle depth comparator 40 which is coupled to the base electrode of the transistor 184 through a resistor 200. During the absence of a brake release signal, the output of the cycle depth comparator 40 is ground potential and the transistor 184 is biased into conduction to supply the deceleration reference current to the summing junction 182. Upon the generation of a brake release signal, the transistor 184 is biased off so that the cycle depth integrator integrates only the wheel acceleration signal supplied to the summing junction 182 through the capacitor 180. The cycle depth signal is therefore a composite signal comprised of a first portion representing the amount that the time integral of the deceleration reference signal exceeds wheel speed during brake application and a second portion which is the integral of wheel acceleration during brake release, the composite signal having a lower integration limit of zero.

Since the deceleration reference signal supplied to the summing junction 182 through the transistor 184 is approximately equal to the deceleration reference supplied to the summing junction 154 in the deceleration switch 30, the cycle depth signal output of the cycle depth integrator has a magnitude which generally represents the magnitude of the change in wheel speed during the period of the brake release signal supplied by the cycle depth comparator 40. The cycle depth signal representing the cycle depth is supplied to the positive input of the amplifier 174 in the cycle depth comparator 40 through a scaling resistor 202.

During the period of a brake release, the transistor 184 is nonconducting and the capacitor 190 discharges through the resistor 188. The rate of discharge of the capacitor 190 is releated to the deceleration reference current supplied to the junction 182 while the transistor 184 is conducting so that upon the termination of the brake release signal, and the resulting conduction of the transistor 184, a current pulse is supplied through the resistor 186 resulting from the recharging of the capacitor 190 having an amplitude and duration which sets the magnitude of the cycle depth signal from the cycle depth integrator to a value which the cycle depth signal would have obtained if the reference deceleration were continually supplied to the junction 182 through the transistor 184. When the average wheel deceleration is less than the reference deceleration supplied through the resistors 186 and 188, the cycle depth signal from the cycle depth integrator is reset to ground potential. However, when the average wheel deceleration exceeds the reference deceleration supplied through the resistors 186 and 188, the cycle depth signal is set to the value previously described. Continued deceleration of the wheel beyond the reference deceleration is effective to continually increase the level to which the cycle depth signal is reset. This is reflected in the increased current supplied to the positive input of the amplifier 174 through the resistor 202.

The deceleration amplifier 34 includes an operational amplifier 204 having its positive input terminal grounded. A filter resistor 206 and a differentiating capacitor 208 are series coupled between the conductor 28 carrying the wheel speed signal and a junction 210. The current through the capacitor 208 represents wheel acceleration. This signal is coupled to the negative input of the amplifier 204 through a diode 212. A feedback filter capacitor 214 is coupled between the output of the amplifier 204 to the junction 210. A resistor 216 is parallel coupled with the capacitor 214.

The deceleration amplifier 34 provides a first portion of a cycle depth reference having a magnitude proportional to vehicle deceleration until it saturates at a specified deceleration level, which in this embodiment, is 0.8g. Thereafter, a further wheel deceleration decreases the voltage at the junction 210 while the current through the resistor 216 flowing into the junction 210 tends to restore the voltage at approximately the 0.8g level. The voltage at the junction 210 then represents the departure of the vehicle wheel speed from a reference speed decelerating at approximately the deceleration represented by the feedback through the resistor 216. As the wheel begins to accelerate and the voltage at the junction 210 rises in response to the wheel speed departure approaching zero, the output of the deceleration amplifier 204 again decreases to ground potential. The first portion of the cycle depth reference signal from the deceleration amplifier 34 when at saturation may represent, for example, a cycle depth of 3 mph.

The scaling of the deceleration amplifier 34 is such that the control signal generated by the deceleration switch 30 is always terminated before the output of the deceleration amplifier 34 goes out of saturation to insure that the first portion of the cycle depth reference output of the deceleration amplifier 34 is at its maximum level of 3 mph each time that the deceleration switch 30 terminates the control signal.

The acceleration switch 36 includes a filter resistor 218 series coupled with a differentiating capacitor 220 between a summing junction 221 and a filter 224, which supplies a signal representing wheel speed. The filter 224 includes a resistor 226 and a capacitor 228 series coupled between the conductor 28 carrying the wheel speed signal and ground. The voltage across the capacitor 228 is a filtered wheel speed signal. The current input to the summing junction 221 through the capacitor 220 represents wheel acceleration. A resistor 222 is coupled between the summing junction 221 and ground. The summing junction 221 is coupled to the base of a PNP transistor switch 230 through a resistor 232. The emitter of the transistor switch 230 is coupled to the regulated voltage Z+ and the collector thereof is coupled to the negative input of an operational amplifier 234 through a resistor 236. Current is supplied to the positive input of the amplifier 234 from the regulated voltage Z+ through a resistor 238.

The base of the transistor switch 230 is coupled to ground through the resistors 222 and 232 so that it is normally conductive. The current out of the summing junction 221 through the resistor 222 has a magnitude representing a reference positive wheel acceleration which is 2.0g in this embodiment. This acceleration reference signal is summed at the summing junction 221 with the wheel acceleration signal from the differentiating capacitor 220. In the absence of wheel acceleration and for wheel accelerations less than the reference accelerations represented by the current through the resistor 222, the current from the summing junction 221 through the resistor 222 is sufficient to maintain the transistor 230 biased conductive. During periods of wheel acceleration, current through the capacitor 220 supplies current to the summing junction 221 with the amount of current through the capacitor 220 being a function of the magnitude of wheel acceleration. When the wheel acceleration is such that the current through the capacitor 220 equals the reference acceleration current (wheel acceleration equaling the reference acceleration), the transistor switch 230 is biased nonconductive. The resistor 232 functions to set a value of wheel speed change required before the transistor switch 230 can be biased nonconductive.

The amplifier 234 functions as a current and voltage amplifier and also provides a phase inversion so that its output is a high level for positive accelerations in excess of the 2.0g reference acceleration. This high level output of the acceleration switch 36 comprises a second portion of a cycle depth reference signal. The second portion of the cycle depth reference signal from the acceleration switch may represent a cycle depth of 3 mph.

The first and second portions of the cycle depth reference outputs of the deceleration amplifier 34 and the acceleration switch 36 are coupled to the anode of respective diodes 240 and 242 in the gate 46. The cathodes of the diodes 240 and 242 are each coupled to the negative input of the amplifier 174 in the cycle depth comparator 40 through a scaling resistor 244. The diodes 240 and 242 function to couple the first or second portion of cycle depth reference signals from the deceleration amplifier 34 and the acceleration switch 36 having the greatest magnitude to the amplifier 174.

The wheel speed signal on line 28 is coupled to the negative input of the amplifier 174 of the cycle depth comparator through a scaling resistor 246. The current input to the amplifier 174 through the resistor 246 comprises a third portion of the cycle depth reference signal and may represent a cycle depth of 1.5 mph for each 10 mph of wheel speed. The cycle depth reference comprised of the first or second and the third portions are compared with the cycle depth represented by the magnitude of the cycle depth signal output of the cycle depth integrator 32, as will be described, to control the duration of a brake release cycle in a particular mode of operation of the wheel lock control system.

The release inhibit circuit 38 includes a filter resistor 245 and a differentiating capacitor 247 series coupled between the output of the filter 224 supplying the signal representing wheel speed and the negative input of an operational amplifier 248. The capacitor 247 supplies an acceleration signal to the negative input of the amplifier 248. A feedback filtering capacitor 250 is coupled between the output of the amplifier 248 and its negative input.

A first portion of a positive acceleration reference signal for the release inhibit circuit 38 is a constant current supplied from the regulated voltage Z+ to the positive input of the amplifier 248 through a resistor 252 and a second portion of the positive acceleration reference signal is a current having a magnitude proportional to the cycle depth which is supplied to the negative input of the amplifier 248 through a scaling resistor 254 coupled to the output of the cycle depth integrator 32 supplying the cycle depth signal. The net positive acceleration reference supplied to the inputs of the amplifier 248 represents the wheel speed approaching vehicle speed and may, for example, represent a wheel acceleration of 0.5g when the cycle depth is zero and decreasing to 0.1g when the cycle depth is maximum.

When the wheel is decelerating or has a positive acceleration less than the reference acceleration, the amplifier 248 supplies the release inhibit signal to the negative input of the amplifier 174 in the cycle depth comparator 40 through a diode 256 and a scaling resistor 258.

The release inhibit signal is terminated when the wheel positive acceleration exceeds the reference positive acceleration. The release inhibit signal is also terminated by the control signal generated by the deceleration switch 30 which is coupled to the negative input of the amplifier 248 through a scaling resistor 260. The release inhibit signal is again provided upon both the termination of the control signal and when the positive wheel acceleration decreases to the low positive acceleration representing the wheel speed approaching vehicle speed.

In addition to the elements previously described, the cycle depth comparator 40 includes a resistor 262 coupled between the regulated voltage Z+ and the positive terminal of the amplifier 174 to remove the wheel speed bias introduced by the emitter-base voltage drop of the transistors 144 and 146 in the speed selector 26. A feedback resistor 264 is coupled between the positive input and the output of the amplifier 174 which provides a feedback current during a brake release signal that is equal to the third portion of the cycle depth reference, which is proportional to wheel speed, when the wheel speed is at, for example, 25 mph.

The scaling of the resistors 176, 202, 244, 246 and 258 is such that the current supplied to the negative input of the amplifier 174 through the resistor 258 during a release inhibit signal provided by the release inhibit circuit 38 is greater than the magnitude of the current supplied to the positive input through the resistor 202 during maximum values of the cycle depth signal provided by the cycle depth integrator 32. Further, the current to the positive input through the resistor 176 during a control signal provided by the deceleration switch is greater than the maximum total of the cycle depth reference currents supplied to the negative input through the resistors 244 and 246. Therefore, the cycle depth integrator 32 is ineffective to initiate a brake release and the deceleration switch 30 is singularly effective to initiate the generation of the brake release signal and the resulting brake release upon detection of an incipient wheel lock condition and is effective to maintain the brakes released for the duration of the control signal. Also, the release inhibit signal generated by the release inhibit circuit 38 is always effective to command brake application.

The output driver and shutdown circuit 34 includes a Darlington transistor 266 which is controlled by the brake release signal and a Darlington transistor 268 which is controlled to provide for shutdown of the wheel lock control system and to prevent a brake release upon the detection of certain system faults. The transistors 266 and 268 are series coupled across the vehicle battery B+ through a resistor 270, a resistor 272 and a resistor 274. The emitter of the transistor 266 is coupled to the base of an NPN transistor 276 whose emitter is grounded and whose collector is coupled to one side of the release solenoid 44. The junction between the resistors 270 and 272 is coupled to the base of a PNP transistor 278 whose emitter is coupled to the battery voltage B+ and whose collector is coupled to the remaining side of the release solenoid 44. A resistor 280 is coupled across the emitter and collector terminals of the transistor 278.

The shutdown transistor 268 normally receives a positive voltage through a conductor 282 and a resistor 284 from the self-check circuit during the absence of system faults. The tansistor 268 is therefore normally biased conductive during normal operation of the wheel lock control circuit.

The brake release signal from the cycle depth comparator 40 is coupled to the base of the transistor 266 through a resistor 268. The brake release signal is effective to bias the transistor 266 conductive which in turn biases the transistor 276 conductive to apply ground potential to one side of the solenoid 44. Simultaneously, current through the resistors 270 and 272 is effective to provide a voltage which biases the transistor 278 conductive to apply the battery voltage B+ to the other side of the release solenoid 44 which is thereby energized to effect release of the vehicle brakes for the duration of the release signal from the cycle depth comparator 40. Upon termination of the brake release signal, the transistor 266 is biased nonconductive to deenergize the release solenoid 44 and thereby effect brake reapplication.

The operation of the wheel lock control logic portion of the circuit of FIGS. 2a and 2b will be described with reference to the FIGS. 3a – 3d which illustrate the wheel lock control operation in its three operation modes. In each of the FIGS. 3a – 3d, curve A represents the magnitude of the wheel speed change after the wheel brakes have been released and is the cycle depth represented by the cycle depth signal from the cycle depth integrator 32, curve B is a reference wheel speed decelerating at the rate of the reference deceleration in the deceleration switch 30, curve C is a reference wheel speed decelerating at the rate of the reference deceleration in the deceleration amplifier 34 and curve D is the cycle depth reference supplied to the cycle depth comparator 40 from the deceleration amplifier 34, the acceleration switch 36 and the wheel speed component from the conductor 28.

The wheel lock control system becomes operative to control the vehicle braking when the brakes are applied and the wheel deceleration exceeds the deceleration reference of the deceleration switch 30. During wheel lock control operation, the wheel lock control circuit has three modes of operation to provide optimum control of the wheel brakes during braking for all vehicle load and road surface conditions. in all three modes, the deceleration switch 30 is singularly effective to provide for a brake release when the wheel deceleration exceeds the reference deceleration therein representing an incipient wheel lock condition.

Figure 3A:
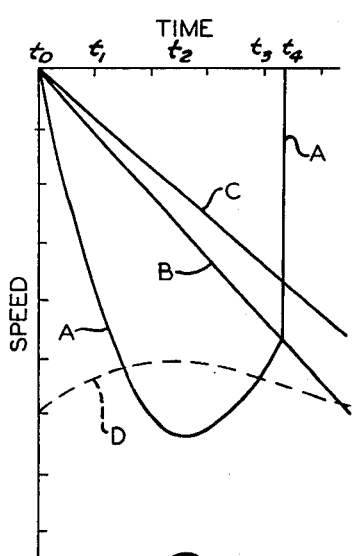

In the first mode of operation, the duration of the brake release period is controlled solely by the deceleration switch 30. This mode of control is generally associated with heavy vehicle loads and/or high coefficient of friction road surfaces wherein the cycle depth during a brake release tends to be shallow and short. This mode of operation is illustrated in FIG. 3a wherein at time $t_0$, the wheel deceleration exceeds the reference deceleration and the deceleration switch 30 supplies the control signal to the release inhibit circuit 38 to terminate the release inhibit signal and to the cycle depth comparator 40 which generates a brake release signal to effect energization of the release solenoid 44 to release the vehicle brakes. Due to the delays in the brake system, the brake pressure will continue to increase after the release solenoid 44 is energized causing the wheel deceleration to increase beyond the reference deceleration of the deceleration switch 30. This is reflected in the cycle depth signal (curve A). At time $t_1$, the cycle depth magnitude becomes greater than the cycle depth reference (curve D). At time $t_2$, the wheel deceleration stops in response to the decreased brake pressure and begins to accelerate toward vehicle speed. At time $t_3$, the cycle depth decreases to below the cycle depth reference (curve D). However, the brake release signal is continued at the output of the cycle depth comparator 40 in response to the control signal being generated by the deceleration switch 30. At time $t_4$, the wheel speed deviation from the reference speed (curve B) decelerating at the reference rate of the reference deceleration of the deceleration switch 30 is reduced to zero and the deceleration switch 30 terminates the control signal. At this time, the cycle depth reference signal supplied to the cycle depth comparator 40 exceeds the cycle depth and the termination of the control signal is effective to terminate the brake release signal at the output of the cycle depth comparator 40 to provide for brake reapplication. Termination of the brake release signal is effective to reset the cycle depth signal to ground potential, the average wheel deceleration assumed to be less than the deceleration reference in the cycle depth integrator 32. Thereafter, the wheel acceleration stops and then begins to decelerate in response to the increasing brake pressure. The cycle is repeated as previously described until the vehicle comes to a stop, the vehicle brakes are released by the vehicle operator, or other road surface or vehicle conditions are encountered which may shift the cyclic mode of the controller. This mode of operation, where the deceleration switch 30 is effective to control the duration of brake release, provides optimum wheel lock control for heavy vehicle load conditions and/or high coefficient of friction road surfaces.

Figure 3C:
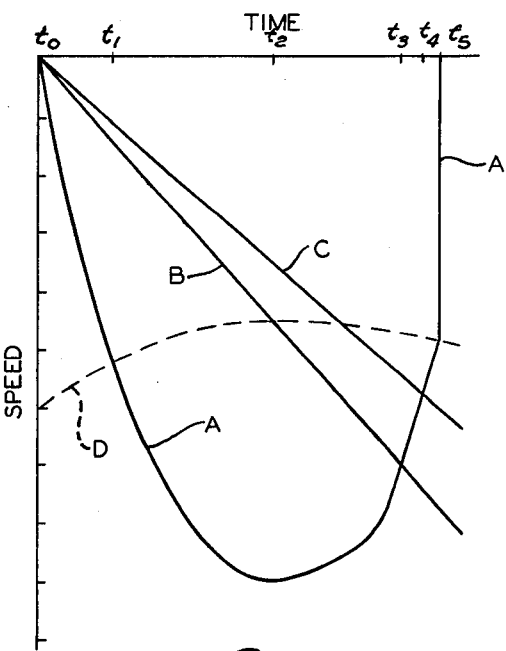
Figure 3B:
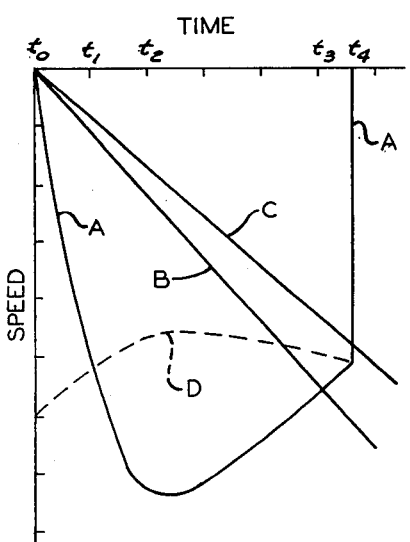

In the second mode of operation, the duration of the brake release is controlled by the cycle depth signal output of the cycle depth integrator 32. This mode of control is generally associated with medium coefficient of friction road surfaces and/or medium vehicle loads where the cycle depth during brake release tends to be deeper and longer than in the first mode of operation. This mode of operation is illustrated in FIGS. 3b and 3c wherein at time $t_0$ in each figure, the wheel deceleration exceeds the reference deceleration representing an incipient wheel lock condition and the deceleration switch 30 generates the control signal to terminate the release inhibit signal and initiate a brake release signal to initiate a brake release as in the first mode of operation. Upon release of the vehicle brake, the wheels continue to decelerate as illustrated by the cycly depth (curve A) as previously described as a result in the delay in the brake system. Due to the lower coefficient of friction surface and lower vehicle loading, the cycle depth is generally greater and of longer duration than the cycle depth associated with high coefficient of friction surfaces and high loading conditions. At time $t_1$, the cycle depth (curve A) exceeds the magnitude of the cycle depth reference (curve D). At time $t_2$, the wheel deceleration stops and the whel begins to accelerate toward the vehicle speed due to the decreased braking forces. In FIG. 3b, the wheel attains a maximum acceleration less than the 2g reference in the acceleration switch 36 and in FIG. 3c attains a maximum acceleration greater than the 2g reference. At time $t_3$, the wheel speed deviation from the reference speed (curve B) decelerating at the reference rate of the deceleration switch 30 is reduced to zero and the deceleration switch 30 terminates the control signal. However, at the time $t_3$ the cycle depth is still greater than the cycle depth reference (curve D) determined by wheel speed and the deceleration amplifier 34 in FIG. 3b and the acceleration switch 36 in FIG. 3c so that the brake release signal from the cycle depth comparator 40 is maintained.

In the illustration of the second mode of operation provided by FIG. 3b, the cycle depth magnitude decreases to below the cycle depth reference at time $t_4$. The brake release signal is therefore terminated by the cycle depth comparator 40 to effect brake reapplication. In the illustration of the second mode of operation provided by FIG. 3c, the wheel speed deviation from the reference speed (curve C) decelerating at the reference deceleration of the deceleration amplifier 34 is reduced to zero at time $t_4$ and the output of the deceleration amplifier 34 decreases to ground potential. However, the acceleration switch 30 continues to supply its portion of the cycle depth reference through the gate 46 in response to the positive wheel acceleration exceeding the 2g acceleration reference therein. Therefore, the cycle depth reference remains unaltered and the brake release signal from the cycle depth comparator 40 is maintained. At time $t_5$ in FIG. 3c, the cycle depth decreases to below the cycle depth reference at which time the brake release signal is terminated by the cycle depth comparator 40 to effect wheel brake reapplication.

Termination of the brake release signal in the FIGS. 3b and 3c is effective to reset the cycle depth signal to ground potential, the average wheel deceleration assumed to be less than the deceleration reference in the cycle depth integrator 32. Thereafter, the wheel continues to accelerate for a time period and then again begins to decelerate in response to the applied brakes and the cycle is repeated as previously described until the vehicle comes to a stop, the vehicle brakes are released by the vehicle operator or other road surface or vehicle conditions are encountered which may shift the cyclic mode of the controller. The second mode of operation illustrated in FIGS. 3b and 3c, where the cycle depth integrator is effective to control the duration of brake release, provides optimum wheel lock control for medium vehicle loading and/or medium coefficient of friction road surfaces.

Figure 3D:
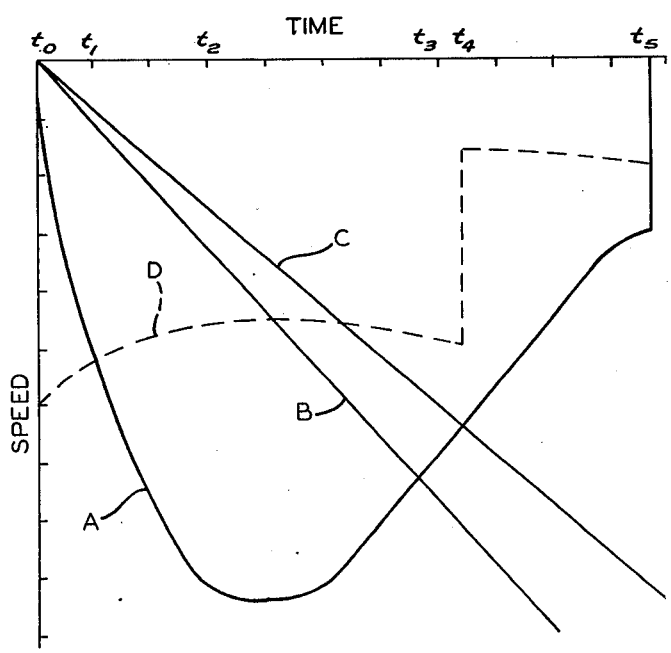

Referring to FIG. 3d, there is illustrated the third mode of wheel lock contol operation wherein the duration of the brake release is controlled by the release inhibit circuit 38. This mode of control is generally associated with low coefficient of friction surfaces and/or light vehicle loading where the cycle depth during brake release tends to be deeper and longer than in the first and second modes of operation. As in the previous mode of operation, brake release is initiated at time $t_0$ when the wheel deceleration exceeds the deceleration reference of the deceleration switch 30 which generates the control signal to terminate the release inhibit signal and initiate a brake release signal. At time $t_1$, the cycle depth (curve A) exceeds the magnitude of the cycle depth reference (curve D). At time $t_2$, the wheel deceleration stops and the wheel begins to accelerate due to decreased braking forces. Due to the low coefficient surface and/or low vehicle loading, the positive wheel acceleration remains below the 2g reference of the acceleration switch 36 but is greater than the positive acceleration reference of the relase inhibit circuit 38. At time $t_3$, the wheel speed deviation from the reference speed (curve B) decelerating at the reference rate of the deceleration switch 30 is reduced to zero and the deceleration switch 30 terminates the control signal. However, the cycle depth is still greater than the cycle depth reference provided by the wheel speed signal and the deceleration amplifier 34 so that the brake release signal is maintained by the cycle depth comparator 40. At time $t_4$, the wheel speed deviation from the reference speed (curve C) decelerating at the reference deceleration provided in the deceleration amplifier 34 is reduced to zero and the output of the deceleration amplifier 34 reduces to ground potential resulting in a decrease in the cycle depth reference to a value determined by the wheel speed signal as the wheel acceleration is below the 2g acceleration reference of the acceleration switch 36. The cycle depth continues to be greater than this lower value of cycle depth reference so that the brake release signal is maintained by the cycle depth comparator 40. At time $t_5$, the wheel acceleration decreases to a level below the acceleration reference of the release inhibit circuit 38 representing the wheel speed approaching vehicle speed. The release inhibit signal is therefore supplied to the cycle depth comparator 40 which terminates the brake release signal in response thereto to effect brake reapplication.

The third mode of operation illustrated in FIG. 3d provides optimum wheel lock control for light vehicle loading and/or low coefficient of friction road surfaces and cooperates with the first and second modes of operation to provide optimum wheel lock control operation for all vehicle load and road surface conditions.

During wheel lock control operation in the above described three modes of operation, the transistor 184 in the cycle depth integrator 32 is biased nonconductive during the time period of the brake release signal from the cycle depth comparator 40 and therefore during the time period of wheel brake release. During this time period, the capacitor 190, which was previously charged to the voltage across the resistor 188 discharges through the resistor 188 at a rate related to the deceleration reference provided when the transistor 184 is conducting. Upon termination of the brake release signal, the transistor 184 is agains biased conductive. The resulting current pulse supplied to the negative input of the amplifier 192 as the capacitor 190 recharges is such that the cycle depth signal is set to the value it would have obtained if the transistor 184 were always conducting throughout the duration of the brake release signal and the deceleration reference supplied therethrough were continually summed with the wheel acceleration signal.

If the average wheel deceleration is less than the reference deceleration supplied while the transistor 184 is conducting, the cycle depth signal will be set to ground potential upon the termination of each one of the brake release signals. However, when the average wheel deceleration exceeds the value of the reference deceleration supplied when the transistor 184 is conducting and which represents the maximum possible vehicle deceleration, the cycle depth signal is set to a positive level which is equal to the level it would have obtained if the reference deceleration were continually summed with the vehicle acceleration signal throughout the period of the brake release signal. If the average wheel deceleration continues to exceed the reference deceleration level, the magnitude of the cycle depth signal continues to be set to a progressively higher level until such time that during a brake release period, the output of the cycle depth integrator increases to a value greater than the cycle depth reference supplied through the resistors 244 and 246 to maintain the brake release signal after termination of the control signal by deceleration switch 30 to allow for wheel speed recovery toward vehicle speed. This condition may exist, for example, when the vehicle brakes are slowly applied by the vehicle operator on low coefficient of friction surfaces so that the wheel cycle depth is similar as in braking on high coefficient surfaces and the system operates in the first mode of operation. When the cycle depth signal attains a magnitude sufficient to maintain the release after termination of the control signal, the brake reapplication is generally controlled as in the third mode of control so that the wheel speed is again allowed to increase to near vehicle speed. In this manner, the cycle depth integrator insures that the wheel will not approach a wheel lock condition that would occur if the wheel deceleration were allowed to continue to exceed the maximum possible vehicle deceleration.

The remaining portion of the circuit of FIGS. 2a and 2b is directed toward the self-check circuit for disabling the wheel lock control system by commanding brake application and preventing brake release when certain system faults are detected.

The self-check timer 50 receives one current input to the negative input of the amplifier 288 from the output driver and shutdown circuit 42 through a conductor 293, a diode 294 and a resistor 296. This current is supplied by the circuit 42 from the battery voltage B+, the resistor 280 and the release solenoid 44 when the transistor 276 is biased nonconductive to provide for wheel brake application and if the release solenoid 44 is not faulted as by a short to ground or open circuit. This current, which is insufficient to energize the release solenoid, is greater than the bias current to the amplifier 288 through the resistor 292 in the timer 50 so that the timer output is normally at ground potential assuming no additional inputs to the positive input of the amplifier 292.

The self-check timer 50 also receives a current at the negative input of the amplifier 288 having a magnitude proportional to the cycle depth during wheel lock control operation. This current is supplied by the cycle depth integrator 32 through a conductor 298, a resistor 300 and the resistor 296.

Upon the initiation of a brake release wherein the transistor 276 is biased conductive or upon the occurrence of an open or short to ground circuit fault in the solenoid winding 44, the current to the timr 50 through the conductor 293 is terminated and the output of the amplifier 288 begins to integrate positive as a result of the current through the resistor 292 with the rate of increase being varied as a function of the cycle depth related current through the conductor 298. The output of the timer integrates to the trigger level of the self-check comparator 54 after a time representing an excessively long brake release period, which time is extended for increasing levels of the cycle depth. Upon the termination of the release or the correction of the short or open circuit release solenoid 44, the timr output integrates down to ground potential.

The self-check timer also receives a sensor fault current at the positive input of the amplifier 288 from a sensor continuity check circuit 48 which monitors the sensors 14 and 16 and supplies the sensor fault current upon the detection of an open circuit fault in either of the sensors 14 and 16.

The sensor continuity check circuit 48 includes an NPN transistor 302 whose collector is coupled to the battery voltage B+ through a resistor 304 and whose emitter is coupled to the positive input of the amplifier 288 in the timer 50. The ungrounded side of each of the sensors 14 and 16 are coupled to the base of the transistor 302 through respective resistors 308 and 306. A filter capacitor 310 is coupled between the base of the transistor 302 and ground.

The base of the transistor 302 is normally at near ground potential through the low impedance of the sensors 14 and 16. Consequently, when the sensors 14 and 16 are in an unfaulted condition, the transistor 302 is biased nonconductive. If an open circuit should occur in one or both of the sensors 14 or 16, the base bias of the transistor 302 is increased by the voltage applied thereto from the regulated voltage source Z+ through the resistors 76 and/or 94 and the resistors 306 and/or 308. This voltage is sufficient to bias the transistor 302 conductive to supply the sensor fault current to the positive input of the amplifier 288 in the self-check timer 50. This sensor fault current, when summed with the bias current through the resistor 292, always exceeds the current to the negative input of the amplifier 288 so that the output of the amplifier integrates positive and attains the trigger level of the self-check comparator 54 after a specified time period. Correction of the sensor fault and termination of the sensor fault current results in the output of the timer 50 integrating down to ground potential.

The power supply fault current supplied by the regulated power supply 52 when the battery voltage B+ decreases below the regulated voltage Z+, as previously described, is coupled to the positive input of the amplifier 288 through the conductor 74. This power supply fault current functions in the same manner as the sensor fault current to cause the output of the amplifier 288 to integrate positive to the trigger level of the self-check comparator 54 after a specified time period. When the B+ voltage again increases to above the Z+ voltage, the power supply fault current is terminated and the output of the timer 40 integrates down to ground potential.

The output of the self-check timer 50 is coupled to the negative input of an operational amplifier 312 in the self-check comparator 54 through a resistor 314. A bias current is also supplied to the negative input through a resistor 316 coupled between Z+ and the negative input terminal. A first feedback resistor 318 is coupled between the output of the amplifier 312 and its positive input and a second feedback resistor 320 is coupled between its output and its positive input through a diode 322, the anode of the diode being coupled to the output. A current is supplied to the positive input of the amplifier 312 from the output driver and shutdown circuit 42 through a conductor 324, a resistor 326 coupled to the cathode of the diode 322, and the resistor 320 when the wheel lock control system generates a brake release signal. The voltage at the cathode of the diode 322 is limited to the regulated voltage Z+ by a diode 327 coupled between the diode 322 and the regulated voltage Z+. The current is supplied by the output driver and shutdown circuit 42 from the battery voltage B+ and a resistor 328 coupled between the battern voltage B+ and the conductor 324. The conductor 324 is also coupled to the collector of the transistor 266 so that upon the generation of a brake release signal and the resulting conduction of the transistor 266, the current supplied to the comparator 54 through the conductor 324 is terminated. The current to the comparator through the conductor 324 is therefore supplied only when the wheel lock control system logic output is a brake supply signal (absence of a brake release signal).

The circuit values are selected such that in the absence of an output from the timer 50, the current supplied to the positive input of the amplifier 312 through the conductor 324 and the resistor 320 when the wheel lock control system output is a brake apply logic is greater than the current to its negative input through the resistor 316, and the sum of the currents to its positive input through the resistor 318 and the diode 322 and the resistor 320 when its output is at a high level exceeds the current to its negative input through the resistor 316. Therefoe, when the wheel lock control circuit is first energized and provides the brake apply logic, the output of the amplifier 312 shifts to a high voltage which functions to latch the output at the high voltage by the feedback through the resistors 318 and 320. This normally high output is coupled to the transistor 268 through the conductor 282 to bias the transistor 268 conducting so as to enable the output driver and shutdown circuit to effect brake release during the period of a brake release signal provided by the cycle depth comparator 40. The amplifier 312 in the self-check comparator circuit 54 is shifted from its normally high state to ground potential only upon the receipt of a current from the selfcheck timer 50 having a magnitude greater than the trigger level of the comparator 54 which is the difference between the feedback currents to the positive input of the amplifier 312 and the bias current to the negative input through the resistor 316. The self-check timer 50 integrates to provide a signal of this magnitude after a specified time duration after the detection of a fault or a brake release. When the output of the self-check timer 50 attains the trigger lever of the comparator 54, the output of the amplifier 312 shifts to ground potential which comprises the shutdown signal which is effective to bias the transistor 268 in the output driver and shutdown circuit 34 nonconductive to deenergize the brake release solenoid 44 to prevent wheel brake release by the wheel lock control system. The shutdown signal is provided by the comparator 54 as long as the output of the self-check timer 50 remains above the trigger level of the comparator 54.

The response of the self-check comparator 54 to the termination of the fault and subsequent decrease in the output of the timer 50 to below the trigger level of the comparator is dependent upon whether or not the wheel lock control circuit is generating a brake release signal. If the wheel lock control circuit is in a brake apply mode, termination of the fault and subsequent reduction of the output of the self-check timer 50 to below the trigger lever of the comparator 54 results in the self-check comparator 54 terminating the shutdown signal by shifting its output again to the positive voltage level as a result of the current supplied to the positive input of the amplifier 312 from the output driver and shutdown circuit 42 through the conductor 324 during the brake apply mode. However, if the fault is terminated during the time period that the wheel lock control system is generating a brake release signal and therefore in a brake release mode, there are no currents supplied to the positive input of the amplifier 312 and the bias current through the resistor 316 maintains the output of the amplifier at ground potential. Therefore, the self-check comparator is maintained latched into its low state to continue the shutdown signal. Therefore, the output driver and shutdown circuit 42 will be ineffective to provide for brake release for the duration of the brake release signal from the cycle depth comparator 40. Upon termination of the brake release logic signal by the wheel lock control circuit, the shutdown signal is terminated by the resulting current supplied to the amplifier 312 through the conductor 324. In this manner, the self-check comparator 54 provides for non-latching shutdown of the wheel lock control system for the duration of the fault if the fault is corrected during a system brake apply mode and provides for latching shutdown of the wheel lock control system for the longer one of the fault condition or the brake release signal if the fault condition exists at least momentarily with the brake release signal.

The dynamic sensor check circuit 58 includes a pair of PNP transistors 330 and 332. The speed signal from the tachometer 22 is coupled to the base of the transistor 330 and to the emitters of each of the transistors 330 and 332 through a diode 334 and a resistor 336. The speed signal from the tachometer 24 is coupled to the base of the transistor 332 and to the emitters of the transistors 330 and 332 through a diode 338 and the resistor 336. The emitters are also grounded through a resistor 340.

The diodes 334 and 338 apply the maximum wheel speed signal across the voltage divider formed by the resistors 336 and 340. When the highest wheel speed exceeds the lowest wheel speed by a predetermined amount, such as 17 mph, the transistor 330 or 332 having the lowest wheel speed applied to its base is biased conductive to supply a current to the positive input of the cycle depth comparator 40 through a conductor 342 to effect the generation of a brake release signal and the energization of the brake release solenoid 44. After the time period of the self-check timer 50, the self-check comparator 54 provides the shutdown signal to disable the wheel lock control circuit. In this manner, the system is disabled in response to a sensor 14 or 16 that is inoperative for reasons other than loss of continuity.

A warning is provided upon the generation of a shutdown signal to indicate a fault condition to the vehicle operator. The fault signal is coupled to the base of an NPN transistor 344 in the lamp driver 56 through a resistor 346. The collector of the transistor is coupled to the base of a Darlington transistor 348 whose emitter is grounded. The collectors of the transistors 344 and 348 are coupled to a lamp 350 through respective resistors 352 and 354, the remaining side of the lamp being coupled to the battery voltage B+. Upon generation of the shutdown signal, the transistor 344, which is normally conducting, is biased off to bias the transistor 348 conductive to energize the lamp 350 and provide the indication.

The description of the preferred embodiment of this invention for the purpose of illustrating the principles thereof is not to be considered as limiting or restricting the invention since many modifications may be made by the exercise of skill in the art without departing from the scope of the invention.

The embodiments of the invention in which an exclusive property or privilege is claimed are defined as follows:

1. A wheel lock control system for a vehicle with braked wheels comprising:
    means effective to provide a speed signal representing wheel speed;
    a deceleration switch responsive to the speed signal effective to provide a control signal which is initiated when the rate of change of wheel speed exceeds a predetermined threshold deceleration indicative of incipient wheel lock;
    a cycle depth integrator effective to generate a cycle depth signal; and
    control means responsive to the control signal and the cycle depth signal for effecting brake release during the period of the control signal and during the time period the cycle depth signal exceeds a reference value,
    the cycle depth integrator including; means responsive to the speed signal effective to provide an acceleration signal representing wheel acceleration,
    means effective during brake application to provide a deceleration reference signal representing a maximum vehicle deceleration, the deceleration reference signal being terminated during brake release,
    integrating means effective to integrate the sum of the acceleration signal and the deceleration reference signal to provide the cycle depth signal, the cycle depth signal being a composite signal comprises of a first porion representing the amount that the time integral of the deceleration reference signal exceeds the wheel speed during brake application and a second portion which is the integral of wheel acceleration during brake release, and
    means responsive to brake reapplication effective to set the cycle depth signal output of the integrating means to a value equal to the value the cycle depth signal would have obtained if the deceleration reference signal were continually summed with the acceleration signal, the cycle depth signal having a magnitude that increases to a value greater than the reference value after repeated brake release and application cycles when the average wheel deceleration exceeds the maximum possible vehicle deceleration representing the wheel approaching a locked condition to maintain the wheel brake released to allow the wheel to accelerate toward vehicle speed to thereby prevent wheel lock.

2. A wheel lock control system for a vehicle with braked wheels comprising:

means effective to provide a speed signal representing wheel speed;

a deceleration switch responsive to the speed signal effective to provide a control signal wich is initiated when the rate of change of wheel speed exceeds a predetermined threshold deceleration indicative of incipient wheel lock;

a cycle depth integrator effective to generate a cycle depth signal; and control means responsive to the control signal and the cycle depth signal for effecting brake release during the period of the control signal and during the time period the cycle depth signal exceeds a reference value, the cycle depth integrator including; means responsive to the speed signal effective to provide an acceleration signal representing wheel acceleration, means effective to provide a deceleration reference signal representing a maximum vehicle deceleration, a summing junction, means effective to couple the acceleration signal and the deceleration reference signal to the summing junction, the summing junction providing a output signal that is the algebraic sum of the acceleration signal and the deceleration reference signal, integrating means coupled to the summing junction effective to integrate the sum of te acceleration signal and the deceleration reference signal to provide the cycle depth signal, the means effective to provide a deceleration reference signal including a voltage source, a series circuit comprised of a resistor and a switch means coupled between the voltage source and the summing junction, and a capacitor coupled in parallel with the resistor, the switch means being coupled to the contrl means and being biased nonconductive thereby during the period of a brake release and biased conductive thereby for the period of brake application, the cycle depth signal being a composite signal including a first portion representing the amount that the time integral of the deceleration reference signal exceeds the wheel speed during brake application and a second portion which is the integral of wheel acceleration during brake release, the capacitor being charged during periods of brake application and discharging through the resistor during periods of brake release at a rate related to the deceleration reference signal so that a charge pulse is supplied to the summing junction when the switch means is biased conductive to set the cycle depth signal output of the integrating means to a value equal to the value of the cycle depth signal would have obtained if the switch means were continually biased conductive to supply the deceleration reference signal, the cycle depth signal having a magnitude that increases to a value greater than the reference value after repeated brake release and application cycles when the average wheel deceleration exceeds the maximum possible vehicle deceleration representing the wheel approaching a locked condition to maintain the wheel brake released to allow the wheel to accelerate to vehicle speed to thereby prevent wheel lock.

3. A wheel lock control system for a vehicle with braked wheels comprising:

means effective to provide a speed signal representing wheel speed;

a deceleration switch responsive to the speed signal effective to provide a control signal wich is initiated when the rate of change of wheel speed exceeds a predetermined threshold deceleration indicative of incipient wheel lock and terminated when the wheel speed again equals a first reference wheel speed decelerating at the rate of the predetermined threshold deceleration;

a cycle depth integrator responsive to the speed signal effective to generate a cycle depth signal;

a deceleration amplifier for providing a first reference signal when the wheel deceleration exceeds a reference deceleration level less than the predetermined threshold deceleration and terminating the first reference signal when the wheel speed again equals a second reference wheel speed having a deceleration equal to the reference deceleration level;

an acceleration switch responsive to wheel speed for providing a second reference signal during the time period the rate of change of wheel speed exceeds a specified positive acceleration level;

means responsive to wheel speed effective to generate a third reference signal having a magnitude related to the wheel speed;

means effective to sum one of the first or second reference signals having the greatest magnitude with the third reference signal to provide a cycle depth reference signal;

a release inhibit switch effective to generate a release inhibit signal during both the absence of a control signal and when the wheel acceleration is below a predetermined low level representing the wheel speed approaching vehicle speed;

comparator means effective to generate a brake release signal when the sum of the cycle depth signal and the control signal is greater than the sum of the cycle depth reference signal and the release inhibit signal, the release inhibit signal being greater than the maximum value of the cycle depth signal and the control signal being greater than the maximum value of the cycle depth reference signal so that the deceleration switch is singularly effective to initiate a brake release signal, the cycle depth signal having a magnitude representing the wheel speed change during the brake release signal; and control means responsive to the brake release signal for effecting wheel brake release during the period of the brake release signal, the deceleration switch being effective to control the duration of wheel brake release during a first mode of operation of the wheel lock control system, the cycle depth integrator being effective to control the duration of a wheel brake release during the second mode of operation of the wheel lock control system and the release inhibit switch being operative to control the duration of the wheel brake release in a third mode of operation of the wheel lock control system.

4. A wheel lock control system for a vehicle with braked wheels comprising:

means effective to provide a speed signal representing wheel speed;

a deceleration switch responsive to the speed signal effective to provide a control signal which is initiated when the rate of change of wheel speed exceeds a predetermined threshold deceleration indicative of incipient wheel lock;

a cycle depth integrator effective to generate a cycle depth signal; and control means responsive to the control signal and the cycle depth signal for effecting brake release during the period of the control signal and during the time period the cycle depth signal exceeds a certain value, the certain value having a first level greater than all values of the cycle depth signal during brake application and having a second lower level during brake release so that the deceleration switch is singularly effective to initiate brake release, the cycle depth integrator including; means responsive to the speed signal effective to provide an acceleration signal representing wheel acceleration or deceleration, means effective during brake application to provide a deceleration reference signal representing a maximum vehicle deceleration, the deceleration reference signal being terminated during brake release, integrating means effective to integrate the sum of the acceleration signal and the deceleration reference signal to provide the cycle depth signal, the cycle depth signal being a composite signal comprised of a first portion representing the amount that the time integral of the deceleration reference signal exceeds the wheel speed during brake application and a second portion which is the integral of wheel acceleration during brake release, the cycle depth signal having a value below the second level of the reference value upon termination of a control signal generated by the deceleration switch in a first range of road coefficient and wheel load conditions so that the deceleration switch is solely effective to provide optimum wheel lock control in the first range of conditions and the cycle depth signal having a value greater than the second level of the reference value upon termination of a control signal generated by the deceleration switch in a second range of road coefficient and wheel load conditions so that the cycle depth integrator is effective to extend the duration of the brake release initiated by the deceleration switch to provide for optimum wheel lock control in the second range of conditions, and means effective upon brake reapplication to set the integrating means so that the cycle depth signal provided thereby has a value equal to the value the cycle depth signal would have obtained if the deceleration reference signal were continually summed with the acceleration signal, the cycle depth signal having a magnitude that increases to a value greater than the second level of the reference value over a series of brake release and application cycles when the average wheel deceleration exceeds the maximum possible vehicle deceleration representing the wheel approaching a locking condition to extend the brake release upon termination of the control signal from the deceleration switch to allow the wheel to accelerate toward vehicle speed to thereby prevent wheel lock.

* * * * *

UNITED STATES PATENT AND TRADEMARK OFFICE
CERTIFICATE OF CORRECTION

PATENT NO. : 4,061,403

DATED : December 6, 1977

INVENTOR(S) : Philip R. Peterson et al

It is certified that error appears in the above-identified patent and that said Letters Patent are hereby corrected as shown below:

Column 1, line 32, "spaced" should be -- speed --.

Column 14, line 43, the numeral "268" should be the numeral -- 286 --.

Column 16, line 18, "cycly" should be -- cycle --; line 27, "whel" should be -- wheel --; line 54, -- signal -- should be inserted after "reference".

Column 18, line 9, "agains" should be -- again --.

Column 19, line 16, "timr" should be -- timer --; line 27, "timr" should be -- timer --.

Column 20, line 8, the numeral "40" should be the numeral -- 50 --; line 30, "battern" should be -- battery --; line 39, "supply" should be -- apply --; line 50, "Therefoe" should be -- Therefore --.

Column 22, line 57, "comprises" should be -- comprised --.

UNITED STATES PATENT AND TRADEMARK OFFICE
CERTIFICATE OF CORRECTION

PATENT NO. : 4,061,403
DATED : December 6, 1977
INVENTOR(S) : Philip R. Peterson et al It is certified that error appears in the above-identified patent and that said Letters Patent are hereby corrected as shown below:

Column 23, line 35, "a" should be -- an --; line 39, "te" should be -- the --; line 48, "contrl" should be -- control --.

Column 25, line 8, "whichis" should be -- which is --.

Signed and Sealed this

First Day of August 1978

[SEAL]

Attest:

RUTH C. MASON
*Attesting Officer*

DONALD W. BANNER
*Commissioner of Patents and Trademarks*